INVENTOR.
BERNARD SILVER
BY
Arthur H. Seidel
ATTORNEY

//  
United States Patent Office 3,306,783  
Patented Feb. 28, 1967

3,306,783  
DISPOSABLE THERMOCOUPLE LANCE  
Bernard Silver, North Hills, Pa., assignor to Electro-Nite Engineering Co., Philadelphia, Pa., a corporation of Pennsylvania  
Filed Dec. 20, 1961, Ser. No. 160,837  
7 Claims. (Cl. 136—234)

This invention relates to a disposable thermocouple lance. More particularly, this invention, relates to an expendable, immersion-type thermocouple lance particularly adapted to measure the temperature of a molten bath within an open hearth or electric furnace.

The most accurate method for measuring the temperature of a molten bath is by means of a thermocouple which is connected to a recording device. Since the thermocouple must be immersed in the molten bath, the thermocouple must be mounted on an end of an elongated holder which is known in the art as being a lance. Conventionally, thermocouple lances were designed and made from materials which are intended to be permanent. Quite recently, thermocouple lances have been proposed which are of the expendable type wherein the thermocouple end of the lance is consumed during the course of a single temperature reading. Examples of recently developed expendable thermocouples are illustated in U.S. Patents 2,993,944 and 2,999,121.

The thermocouple lance of the present invention is an improvement over the expendable thermocouple illustrated in Patent 2,993,944. The thermocouple lance of the present invention overcomes manufacturing problems associated with the lances in the above mentioned patents thereby providing a lance which is simpler, cheaper, and capable of being more readily reproduced. Also, the thermocouple lance of the present invention is more flexible in its application to measuring temperature and is more accurate than the lances proposed heretofore. At the same time, the lance of the present invention provides a more rigid support for the thermocouple and permits a slight amount of angular displacement between two members of the lance. At the same time, the lance of the present invention provides a polarized rotary connection between said two members of the lance.

It is an object of the present invention to provide a novel expendable immersion-type thermocouple lance.

It is another object of the present invention to provide an immersion-type thermocouple in which the wires are protected from excess heat.

It is another object of the present invention to provide an expendable immersion-type thermocouple which is capable of being easily and rapidly assembled.

It is still another object of the present invention to provide an expendable immersion-type thermocouple lance which is easily and quickly replaceable.

It is still another object of the present invention to provide an expendable immersion-type thermocouple lance in which an expendable thermocouple unit is capable of being secured to a holder in any one of a plurality of rotary positions.

Other objects will appear hereinafter.

For the purpose of illustrating the invention there is shown in the drawings a form which is presently preferred; it being understood, however, that this invention is not limited to the precise arrangements and instrumentalities shown.

Referring to the drawing in detail, wherein like numerals indicate like elements, there is shown in FIGURE 1 an expendable immersion-type thermocouple lance designated generally as 10.

Figure 1:
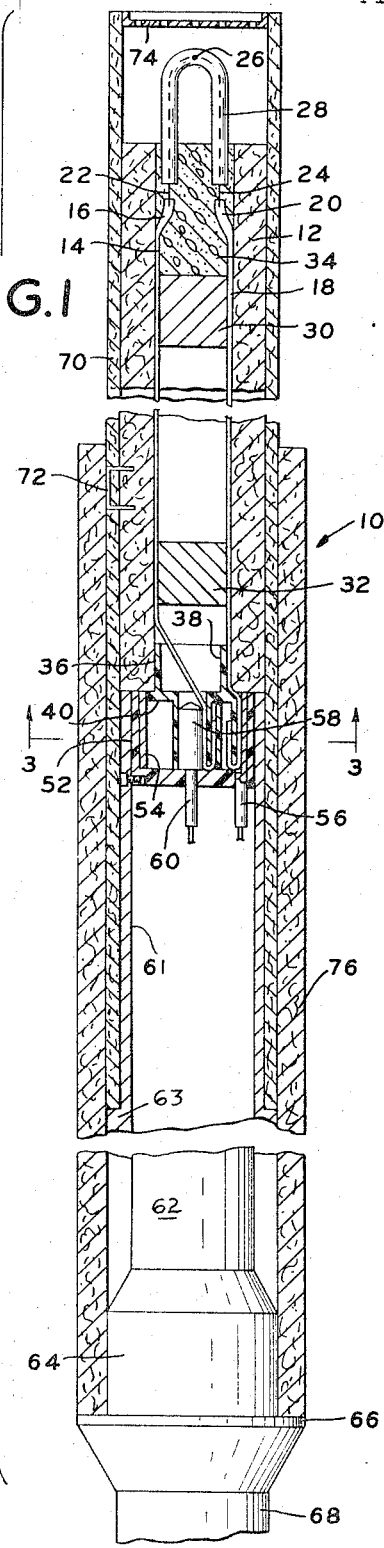
FIGURE 1 is a longitudinal sectional view of the present invention.
Figure 2:
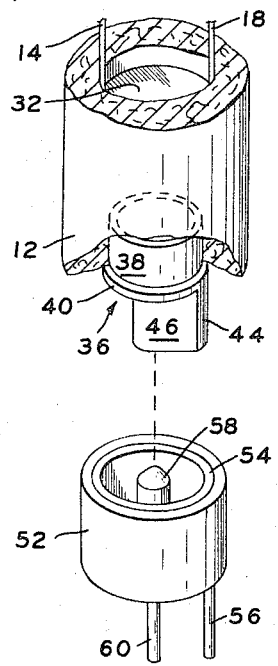
FIGURE 2 is a partial exploded view of the polarized connection between two members of the present invention.

The lance 10 includes a first cardboard tube 12. The tube 12 is a heavy wall, convolute-wound tube of high quality paper. A first wire lead 14 and a second wire lead 18 extend through the tube 12. Wire lead 14 is preferably made from a commercially available No. 11 alloy and is provided with a flattened end 16. Wire lead 18 is preferably a copper wire and is provided with a flattened end 20.

The flattened end 16 is metallurgically joined to one end of a platinum wire 22. The flattened end 20 is metallurgically joined to one end of a platinum rhodium alloy wire 24. The free ends of the wires 22 and 24 are joined together at the hot junction 26. The wires 22 and 24 are of a minimum length so as to reduce cost of the expensive materials involved and provide a rapid response which is necessary for an expendable lance.

The hot junction 26 is disposed at the arcuate portion of a U-shaped protector tube 28. The free ends of the wires 22 and 24 extend through the legs of the tube 28. The tube 28 may be made from any one of a wide variety of materials such as Vycor, quartz, ceramic, etc. A first burn through barrier 30 is disposed within the tube 12 at a point which is approximately one inch below the uppermost end of the tube 12. A second burn through barrier 32 is disposed within the tube 12 at a point spaced approximately one inch from the lowermost end of the tube 12. The burn through barriers 30 and 32 maintain the wire leads 14 and 18 spaced from one another. The burn through barriers 30 and 32 may be made from any one of a variety of slow burning materials such as wood, rockwool, etc. The barriers 30 and 32 are preferably force-fitted into the tube 12.

The free ends of the tube 28, and the metallurgical joint between the wire leads and the thermocouple wires are enveloped by a ceramic cement 34. The ceramic cement 34 acts as an insulator to prevent heat transfer from the molten bath to the metallurgical joints between the thermocouple wires and the wire leads. Also, the cement 34 provides a rigid support for the tube 28.

The free ends of the wire leads 14 and 18 are coupled to a means which provides a polarized connection so that the wire leads may always be coupled to a recorder (not shown) in all rotary positions thereof. Such means includes a first contact holder 36. The holder 36 is an integral one-piece unit made from a flexible synthetic resin such as polyethylene. The holder 36 includes a tubular portion 40 which is force-fitted within the lowermost end of the tube 12.

The tubular portion 38 extends from a base 40 which is adapted to overlie the lowermost end of the tube 12. A hollow cylindrical member 42 depends from the base 40 in line with an aperture extending through the base 40. The cylindrical member 42 is coaxial with respect to the tubular portion 38. An arcuate wall 44 depends from the base 40 and is coextensive with the periphery of the base 40.

Figure 3:
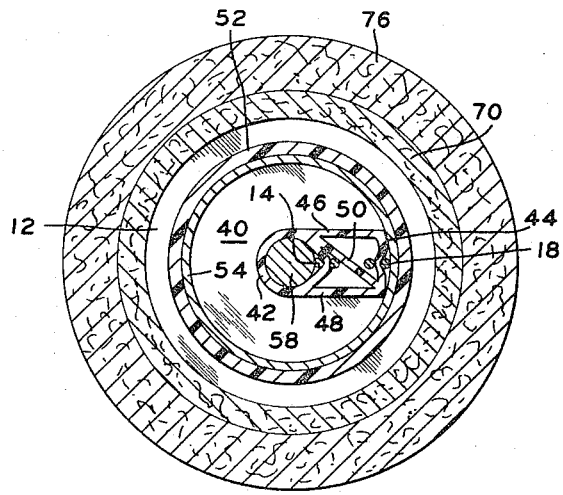
FIGURE 3 is a transverse sectional view taken along the lines 3—3 in FIGURE 1.

A side wall 46 extends from one edge of the wall 44 and is tangent to the cylindrical member 42 as shown more clearly in FIGURE 3. A side wall 48 extends from the other edge of the arcuate wall 44 and is tangent to the cylindrical member 42. A separator wall 50 extends between the walls 46 and 48 thereby forming two discrete pockets.

A second contact holder 52 surrounds the base 40. The holder 52 is a cup-shaped member made from a synthetic resin such as polyethylene. A first annular contact 54 is disposed within the holder 52. Contact 54 is provided with a female-type lead 56. A second contact 58 in the form of a pin having a tapered point is disposed within the cylindrical member 42. The outer diameter of the contact 58 is substantially identical with the inner diameter of the cylindrical member 42. Contact 58 is provided with a female-type lead 60.

The leads 56 and 60 are hollow and are adapted to receive wires extending through a lance holder 61. The holder 61 has a collar 63 which is threaded to one end of an elongated pipe 62. The elongated pipe 62 extends from a collar 64 having a shoulder 66. The collar 64 is connected to a pipe 68 which extends to a handle portion (not shown) which facilitates manipulation of the lance 10 of the present invention. The collar 63 is in abutting contact with the lower end of tube 12.

A second tube 70 is slidably telescoped over and supported by the collar 63 and the first tube 12. Tube 70 is a thin walled, spirally wound cardboard tube having a length greater than the length of tube 12. The upper end of tube 70 in FIGURE 1 extends beyond the upper end of tube 12 for a distance of approximately one and one-half inches so that it may protect tube 28. A staple 72 fixedly secures the tubes 12 and 70 in this predetermined relationship. A perforated cap 74 is force-fitted within the upper end of the tube 70. The cap 74 is preferably made from hard paper. Cap 74 provides additional protection to the thermocouple. The tube 70 may be two separate pieces telescoped over and extending beyond the free ends of tube 12. If tube 70 is made in two pieces, each piece will be stapled or otherwise secured to tube 12.

A third tube 76 is telescopically disposed around tube 70. The lower end of the tube 76 is force-fitted around the collar 64 and is supported by the shoulder 66. The upper end of the tube 76 extends to a point beyond the staple 72. The telescopic arrangement between the tubes 70 and 76 facilitates the shipping of these tubes in a telescoped manner thereby reducing the shipping space. The tube 76 is a heavy cardboard tube which provides the additional protection needed for the polarized connection and the permanent pipe 62.

The expendable thermocouple lance 10 is made as follows:

Wire leads 14 and 18 are inserted through the tube 12. Lead 18 is preferably provided with an enamel coating to prevent a short between the leads in case they happen to touch each other during assembly. If leads 14 and 18 are not ribbons, the ends 16 and 20 are flattened and then metallurgically joined to the free ends of the wires 22 and 24. The burn through barriers 30 and 32 are then force-fitted through the lowermost end of the tube 12 until they assume the disposition illustrated in FIGURE 1. The barriers 30 and 32 are approximately one inch from the adjacent end of the tube 12.

The lowermost end of the leads 14 and 18 are then pulled until the hot junction 26 assumes the position illustrated in FIGURE 1. In this position, the free ends of the tube 28 are below the uppermost end of tube 12. Thereafter, cement 34 is poured onto the barrier 30 until it completely fills the uppermost end of the tube 12. Cement 34 is preferably a quick drying ceramic cement capable of providing a rigid support for the free ends of the tube 28 and acting as an insulator to prevent heat transfer to the metallurgical joints.

The lowermost ends of the leads 14 and 18 are then fed through the contact holder 36. Lead 14 is extended through the cylindrical member 42 and lead 18 is extended along the wall 44. An intermediate portion of the lead 18 is disposed between the tubular portion 38 and the inner peripheral surface of the tube 12. With the holder 36 force-fitted in place, the ends of the leads 14 and 18 are then trimmed to the proper length and folded back so that they enter the pockets on opposite sides of the separator wall 50.

The thusly formed assembled unit is inserted into tube 70. The tubes are adjusted so that the uppermost end of tube 70 is approximately one and one-half inches beyond the uppermost end of the tube 12. A staple 72 is driven through the tubes to keep this assembled relationship. The cap 74 is then force-fitted across the free end of the tube 70. Thereafter, the thusly formed unit is inserted within the tube 76. The telescoped lance is then packaged for shipment.

The lance 10 is utilized as follows:

The packaged lance is removed from its shipping container and tube 76 is extended with respect to tube 70 to the relative position illustrated in FIGURE 1. The telescopic sliding fit between the tubes 70 and 76 facilitates such extension of the tubes. The tube 76 is then manipulated so that the pipe 62 may enter the same until the shoulder 66 abuts the lowermost end of the tube 76 and collar 63 abuts the lowermost end of tube 12. While the lowermost end of the tube 76 is being force-fitted around the collar 64, contact 58 is being inserted into the cylindrical member 42 thereby slightly deforming the same where it is in abutting contact with the lead 14. Simultaneously, the contact 54 engages the wall 44 thereby slightly deforming the same where it contacts the lead 18.

The tube 70 may then be rotated with respect to the tube 76 and pipe 62 to rub off any protective enamel on the leads 14 and 18 and assure good electrical contact. The above operations automatically result in a polarized connection between the leads 14 and 18 and the leads 56 and 60. Hence, care in assembling the lance 10 with respect to the pipe 62 and care in handling of the lance during the reading is avoided. Heretofore, such care was required because prior constructions did not provide a polarized connection which permitted rotary movement. Rotary movement is an inherent result associated with immersion and movement of the lance in a molten bath. Hence, the lance 10 of the present invention does not require a skilled person in order to obtain a temperature reading.

When the lance 10 is immersed in a molten bath, a recording is made in accordance with conventional practice which is indicative of the temperature of the molten bath. In doing so, a substantial portion of the uppermost end of the lance 10 in FIGURE 1 will be consumed by the molten bath. The cap 74, tube 28, cement 34 and barrier 30 assure that the lance 10 will not be consumed too quickly. If desired, the cap 74 need not be provided.

After a reading has been attained, the remainder of the lance 10 will be removed and discarded thereby leaving the pipe 62, lance holder 61 and contact holder 52. When another reading is required, a new lance is removably secured to the pipe 62 in the manner described above. In this manner, calibration of the thermocouple after each reading as was conventional heretofore is eliminated. Likewise, removal and replacement of burned out portions of a permanent lance are eliminated. Thus, the lance 10 of the present invention reduces the time necessary to take a reading, is capable of rough handling by inexperienced personnel, and eliminates connection problems when a polarized coupling is not provided. The flexibility of the holder 36 facilitates a slight amount of angular movement between the pipe 62 and the tube 12. Such angular movement is the result of movement of the lance 10 within the molten bath. The length of the lance 10 within the molten bath of necessity results in a slight angled relationship between the tube 12 and pipe 62 which heretofore presented problems in maintaining electrical contact between the recorder and the wire leads.

The present invention may be embodied in other specific forms without departing from the spirit or essential attributes thereof and, accordingly, reference should be made to the appended claims, rather than to the foregoing specification as indicating the scope of the invention.

I claim:

1. An immersion thermocouple lance extension comprising a first expendable tube having a first end which is not intended to be immersed in a molten bath and a second end which is intended to be immersed in a molten bath, said tube being made from a low temperature resistant material which will be consumed by a molten bath whose temperature is to be ascertained, a second expendable cardboard tube surrounding said first tube, said second tube extending beyond said first end of said first tube, means securing said tubes together, an expendable thermocouple temperature sensing means supported by the second end of said first tube, a first contact holder disposed at and supported by the first end of said first tube, said contact holder having a diameter at least as large as the internal diameter of said first tube, two conductors extending from said thermocouple means through said first tube to said contact holder, one of said conductors extending through an axially extending hole in a central portion of said contact holder, and the other conductor extending to an outer peripheral portion of said contact holder.

2. A thermocouple lance in accordance with claim 1 wherein said contact holder is made from a flexible thermoplastic resin.

3. A thermocouple lance in accordance with claim 1, non-expendable supporting structure usable therewith, said structure including a metal pipe, a second contact holder supported on one end of said pipe, the portion of said second tube extending beyond said first end of said first tube being telescoped over and in direct contact with a portion of said one end of said pipe, said second contact holder having a centrally disposed contact structure electrically coupled to said one conductor in all rotary positions of said holders, said second contact holder having a peripherally disposed contact structure electrically coupled to said other conductor in all rotary positions of said holders.

4. A lance in accordance with claim 3 wherein each of said contact holders are made from a flexible thermoplastic resin, whereby said first tube may be angularly disposed with respect to said pipe without interrupting the electrical coupling between the conductors and the contact structures.

5. A lance in accordance with claim 3 including a third tube, said third tube being telescoped over said second tube, and one end of said third tube being supported by a portion of said pipe remote from said one end of said pipe.

6. A thermocouple lance comprising a first expendable cardboard tube one end of which is an immersion end, a second expendable tube substantially shorter than said first cardboard tube, said second tube having first and second ends and being made from a low temperature resistant material which will be consumed by a molten bath whose temperature is to be ascertained, said first tube surrounding at least a major portion of the outer periphery of said second tube with the second end of said second tube being disposed within said first tube, means securing said tubes together with said first end of said second tube being adjacent the immersion end of said first tube, thermocouple elements secured together at one end to form a hot junction, the other ends of said elements being connected to lead wires within said second tube, a protector tube surrounding said elements, a block of insulating ceramic materials in said first end of said second tube, said protector tube and said elements being supported by said ceramic material, expendable means adapted to be consumed when the immersion end passes through slag for protecting the protector tube and the thermocouple elements during such passage through slag, a plastic contact holder partially extending into and supported by the second end of said second tube, each of the lead wires extending through a separate portion of the contact holder for coupling to spaced electrical contacts, and means structurally interrelating the lead wires and the contact holder to provide a non-directional coupling, said last-mentioned means including one of said wires being disposed adjacent a central portion of said holder and having a contact portion extending in an axial direction with respect to said tubes, said last-mentioned means also including the other wire extending to an outer peripheral portion of the contact holder at a location on the contact holder which is beyond said second end of said second tube.

7. A thermocouple lance in accordance with claim 6 including a heat barrier within said second tube juxtaposed to the ceramic material, and the lead wires being coupled to the thermocouple elements within the ceramic materials.

References Cited by the Examiner
UNITED STATES PATENTS

| | | | |
|---|---|---|---|
| 2,445,159 | 7/1948 | Tegge | 136—4.73 |
| 2,993,944 | 7/1961 | Silver | 136—4.7 |
| 2,999,121 | 9/1961 | Mead | 136—4.7 |
| 3,011,005 | 11/1961 | Silver | 136—4.7 |
| 3,024,295 | 3/1962 | Moore | 136—4.7 |

WINSTON A. DOUGLAS, *Primary Examiner.*

JOHN H. MACK, *Examiner.*

J. H. BARNEY, A. M. BEKLEMAN,
*Assistant Examiners.*